US012738140B2

(12) United States Patent
Wang et al.

(10) Patent No.: US 12,738,140 B2
(45) Date of Patent: Sep. 15, 2026

(54) ULTRA-WIDEBAND-BASED FALL DETECTION

(71) Applicant: Samsung Electronics Co., Ltd., Suwon-si (KR)

(72) Inventors: Han Wang, Allen, TX (US); Wei Sun, Allen, TX (US); Hao Chen, Allen, TX (US); Aditya Dave, Plano, TX (US); Russell Douglas Ford, Campbell, CA (US); Satvir S. Bhatia, Sunnyvale, CA (US); Andrea M. Small, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 47 days.

(21) Appl. No.: 18/902,651

(22) Filed: Sep. 30, 2024

(65) Prior Publication Data

US 2025/0118186 A1 Apr. 10, 2025

Related U.S. Application Data

(60) Provisional application No. 63/542,712, filed on Oct. 5, 2023.

(51) Int. Cl.
*G08B 21/04* (2006.01)
*G01S 13/02* (2006.01)
(Continued)

(52) U.S. Cl.
CPC ........ *G08B 21/043* (2013.01); *G01S 13/0209* (2013.01); *G01S 13/5246* (2013.01);
(Continued)

(58) Field of Classification Search
CPC .. G01S 13/0209; G01S 13/5246; G01S 13/56; G01S 13/582; G01S 7/415;
(Continued)

(56) References Cited

U.S. PATENT DOCUMENTS 7,567,200 B1 7/2009 Osterweil
11,163,052 B2 11/2021 Eckert et al.
(Continued)

FOREIGN PATENT DOCUMENTS

CN 116863646 A 10/2023
CN 114005246 B 1/2024
(Continued)

OTHER PUBLICATIONS

International Search Report and Written Opinion issued Jan. 8, 2025 regarding International Application No. PCT/KR2024/015231, 8 pages.
(Continued)

*Primary Examiner* — Omer S Khan

(57) ABSTRACT

An electronic device includes a transceiver configured to transmit and receive ultrawide band (UWB) radar signals. The electronic device also includes a processor operatively coupled to the transceiver. The processor is configured to, based on the received UWB radar signals, detect a human within a detection area of the transceiver. The processor is further configured to perform, based on the detection of the human within the detection area of the transceiver, a motion detection operation, and perform, based on a result of the motion detection operation, a fall detection operation.

20 Claims, 7 Drawing Sheets

(51) Int. Cl.
*G01S 13/524* (2006.01)
*G01S 13/58* (2006.01)

(52) U.S. Cl.
CPC ........ *G01S 13/582* (2013.01); *G08B 21/0415* (2013.01); *G08B 21/0438* (2013.01)

(58) Field of Classification Search
CPC .............. G08B 21/0415; G08B 21/043; G08B 21/0438; G08B 21/0469
See application file for complete search history.

(56) References Cited

U.S. PATENT DOCUMENTS

| | | | |
|---|---|---|---|
| 2018/0330593 A1* | 11/2018 | Zack | G08B 25/016 |
| 2020/0342735 A1* | 10/2020 | Tan | G01C 5/06 |
| 2022/0026531 A1* | 1/2022 | Wu | G01S 13/88 |
| 2022/0283292 A1* | 9/2022 | Dvash | A61B 5/1113 |
| 2023/0000396 A1 | 1/2023 | Coffey et al. | |
| 2023/0073570 A1 | 3/2023 | Adimoolam et al. | |
| 2024/0004054 A1 | 1/2024 | Rigazio et al. | |
| 2024/0077603 A1 | 3/2024 | Sundholm et al. | |
| 2024/0112559 A1 | 4/2024 | Shin et al. | |
| 2024/0168128 A1* | 5/2024 | Sethuraman | G01S 7/038 |

FOREIGN PATENT DOCUMENTS

| | | |
|---|---|---|
| CN | 117471451 A | 1/2024 |
| WO | 2023131422 A1 | 7/2023 |

OTHER PUBLICATIONS

Han et al. "IR-UWB Sensor Based Fall Detection Method Using CNN Algorithm" Sensors, vol. 20, No. 20, Oct. 2020, 23 pages.

Maitre, J., et al., "Fall Detection With UWB Radars and CNN-LSTM Architecture", IEEE Journal of Biomedical and Health Informatics, vol. 25, No. 4, Apr. 2021, 11 pages.

Mokhtari, G., et al., "Non-wearable UWB Sensor to Detect Falls in Smart Home Environment", IEEE International Conference on Pervasive Computing and Communications Workshops (PerCom Workshops), Mar. 13-17, 2017, 5 pages.

Chen, M., et al., "A Three-Stage Low-Complexity Human Fall Detection Method Using IR-UWB Radar", IEEE Sensors Journal, vol. 22, No. 15, Aug. 1, 2022, 15 pages.

* cited by examiner

ULTRA-WIDEBAND-BASED FALL DETECTION

CROSS-REFERENCE TO RELATED APPLICATION(S) AND CLAIM OF PRIORITY

This application claims priority under 35 U.S.C. § 119(e) to U.S. Provisional Patent Application No. 63/542,712 filed on Oct. 5, 2023. The above-identified provisional patent application is hereby incorporated by reference in its entirety.

TECHNICAL FIELD

This disclosure relates generally to electronic devices. More specifically, this disclosure relates to ultra-wideband (UWB)-based fall detection.

BACKGROUND

Aging of the population is happening rapidly in modern society, and this brings new social problems to human beings. As a result, elderly care has become a significant issue in daily life. For the elderly, fall detection is an emergent need, as falls among the elderly can have severe consequences such as injuries, hospitalizations, and loss of independence. Therefore, fall detection and alarm triggering is crucial to maintain the health of the elderly. A typical use case of fall detection is to report a fall of an elderly individual who lives alone to their relatives and first responders to respond to fall events in a timely manner.

SUMMARY

This disclosure provides apparatuses and methods for UWB-based fall detection.

In one embodiment, an electronic device is provided. The electronic device includes a transceiver configured to transmit and receive ultrawide band (UWB) radar signals. The electronic device also includes a processor operatively coupled to the transceiver. The processor is configured to detect, based on the received UWB radar signals, a human within a detection area of the transceiver. The processor is further configured to perform, based on the detection of the human within the detection area of the transceiver, a motion detection operation, and perform, based on a result of the motion detection operation, a fall detection operation.

In another embodiment, a method of operating an electronic device is provided. The method includes transmitting and receiving UWB radar signals, and detecting, based on the received UWB radar signals, a human within a detection area of the electronic device. The method further includes performing, based on the detection of the human within the detection area of the electronic device, a motion detection operation, and performing, based on a result of the motion detection operation, a fall detection operation.

In yet another embodiment, a non-transitory computer readable medium embodying a computer program is provided. The computer program includes program code that, when executed by a processor of a device, causes the device to transmit and receive ultrawide band radar signals, and detect, based on the received UWB radar signals, a human within a detection area of the device. The program code, when executed by the processor of the device, also causes the device to perform, based on the detection of the human within the detection area of the device, a motion detection operation, and perform, based on a result of the motion detection operation, a fall detection operation.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term “couple” and its derivatives refer to any direct or indirect communication between two or more elements, whether or not those elements are in physical contact with one another. The terms “transmit,” “receive,” and “communicate,” as well as derivatives thereof, encompass both direct and indirect communication. The terms “include” and “comprise,” as well as derivatives thereof, mean inclusion without limitation. The term “or” is inclusive, meaning and/or. The phrase “associated with,” as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term “controller” means any device, system or part thereof that controls at least one operation. Such a controller may be implemented in hardware or a combination of hardware and software and/or firmware. The functionality associated with any particular controller may be centralized or distributed, whether locally or remotely. The phrase “at least one of,” when used with a list of items, means that different combinations of one or more of the listed items may be used, and only one item in the list may be needed. For example, “at least one of: A, B, and C” includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms “application” and “program” refer to one or more computer programs, software components, sets of instructions, procedures, functions, objects, classes, instances, related data, or a portion thereof adapted for implementation in a suitable computer readable program code. The phrase “computer readable program code” includes any type of computer code, including source code, object code, and executable code. The phrase “computer readable medium” includes any type of medium capable of being accessed by a computer, such as read only memory (ROM), random access memory (RAM), a hard disk drive, a compact disc (CD), a digital video disc (DVD), or any other type of memory. A “non-transitory” computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 8, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another or can operate as standalone schemes. Certain embodiments of the disclosure may be derived by utilizing a combination of several of the embodiments listed below. Also, it should be noted that further embodiments may be derived by utilizing a particular subset of operational steps as disclosed in each of these embodiments. This disclosure should be understood to cover all such embodiments.

Detecting falls is an important and challenging task. While there are several techniques to apply devices with accelerometers, gyroscopes and other sensors to detect a fall effectively, reports show that the elderly are not comfortable with wearable devices. Additionally, it is common for the elderly to forget to equip these devices. Thus, ambient fall detection techniques are a good fit to help the elderly non-invasively.

Ultra-wideband (UWB) is a radio technology that has appeared on high-end smartphones, home appliances and Internet of things (IoT) devices. UWB's centimeter-level accuracy surpasses other positioning technologies, making it useful for location detection in indoor environments where GPS signals may be unreliable. UWB's low power consumption allows for minimal interference and for coexistence with existing infrastructure. Based on these features, UWB technology is useful for implementation of a real-time fall detection system. The present disclosure provides various embodiments of methods and apparatuses employing UWB technology for real-time fall detection.

Figure 1:
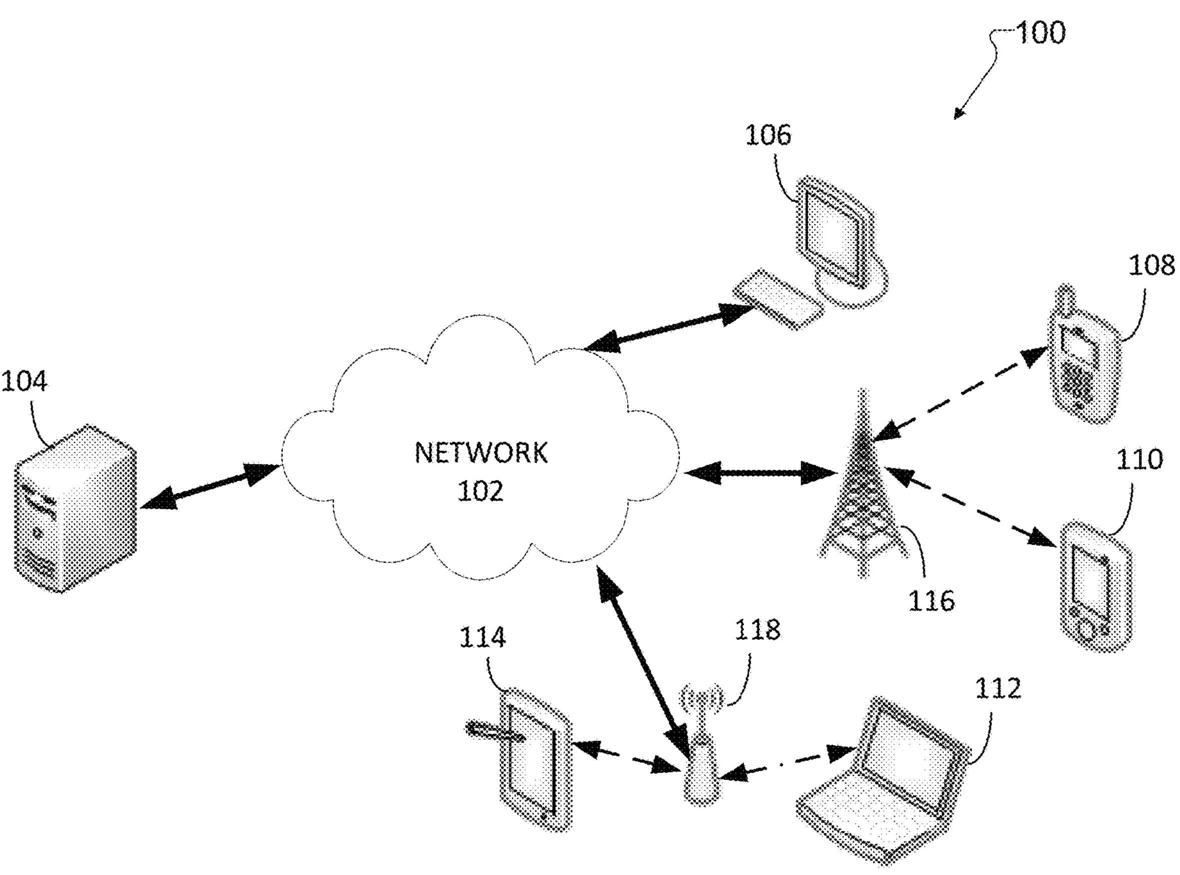
FIG. 1 illustrates an example communication system according to embodiments of the present disclosure.

FIG. 1 illustrates an example communication system 100 according to embodiments of the present disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone (such as a UE), a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100, such as wearable devices. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can perform processes for UWB-based fall detection.

In this example, some client devices 108-114 communicate indirectly with the network 102. For example, the mobile device 108 and PDA 110 communicate via one or more base stations 116, such as cellular base stations or eNodeBs (eNBs) or gNodeBs (gNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s). In certain embodiments, any of the client devices 106-114 transmit information securely and efficiently to another device, such as, for example, the server 104.

As described in more detail below, one or more of the network 102, server 104, and client devices 106-114 include circuitry, programing, or a combination thereof, to support UWB-based fall detection.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
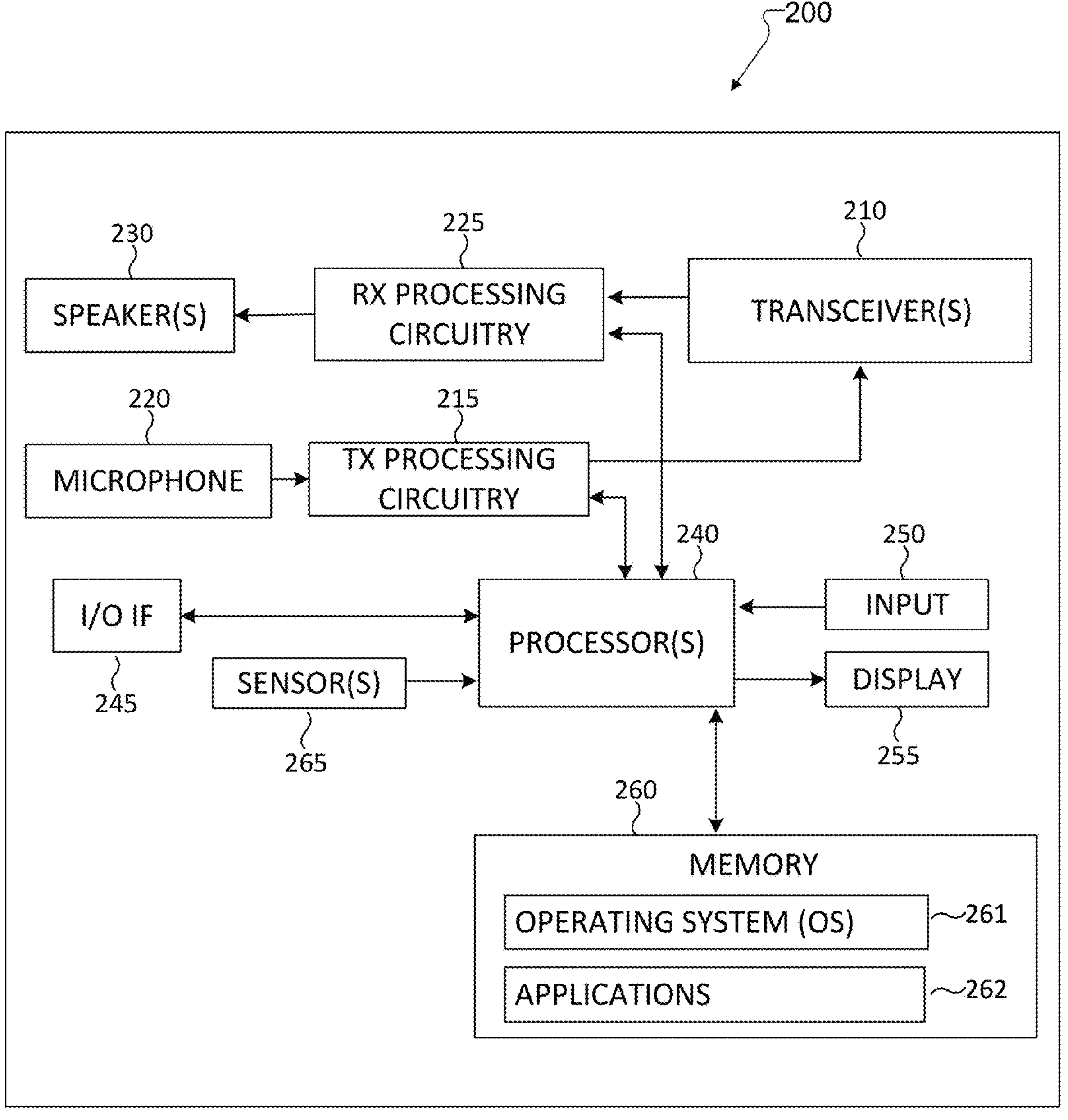
FIG. 2 illustrates an example electronic device according to embodiments of the present disclosure.

FIG. 2 illustrates an example electronic device 200 according to embodiments of the present disclosure. The electronic device 200 could represent the server 104 or one or more of the client devices 106-114 in FIG. 1. The electronic device 200 can be a mobile communication device, such as, for example, a UE, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), an IoT device, a UWB-based fall detection system, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a UWB transceiver, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array including numerous antennas. For example, the transceiver(s) 210 can be equipped with multiple antenna elements. There can also be one or more antenna modules fitted on the terminal where each module can have one or more antenna elements. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a Wifi, BLUETOOTH, cellular, 5G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data). In some embodiments, the transceiver(s) 210 may operate as a component of a monostatic radar, similar as described regarding FIG. 3.

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data, and for example, processes that support methods for UWB-based fall detection. The processor 240 can move data into or out of the memory 260 as required by an executing process. In certain embodiments, the processor 240 is configured to execute the one or more applications 262 based on the OS 261 or in response to signals received from external source(s) or an operator. For example, applications 262 can include a multimedia player (such as a music player or a video player), a phone calling application, a virtual personal assistant, and the like.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user to interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

A common type of radar is the "monostatic" radar, characterized by the fact that the transmitter of the radar signal and the receiver for its delayed echo are, for all practical purposes, in the same location.

Figure 3:
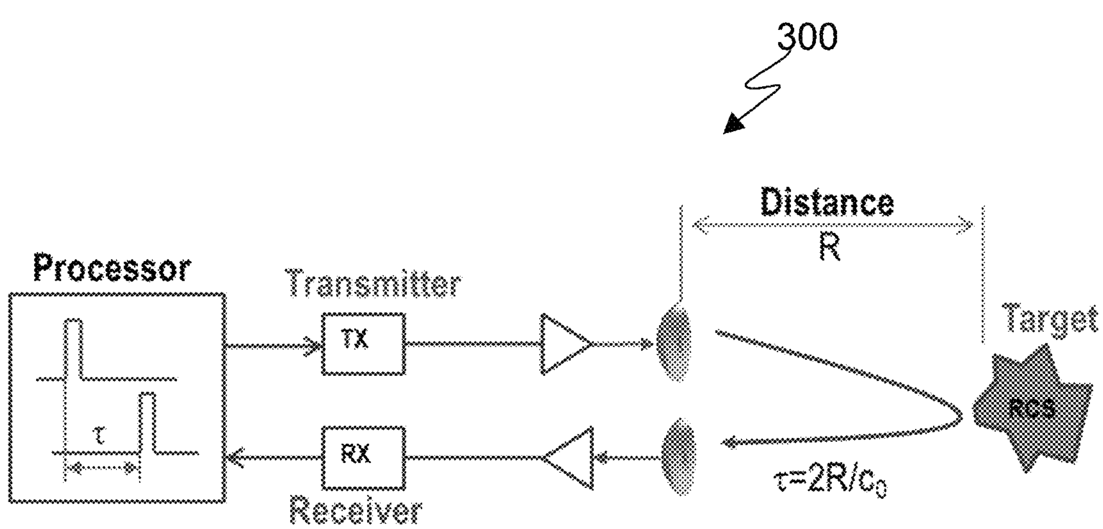
FIG. 3 illustrates an example monostatic radar according to embodiments of the present disclosure.

FIG. 3 illustrates an example monostatic radar 300 according to embodiments of the present disclosure. The embodiment of a monostatic radar 300 of FIG. 3 is for illustration only. Different embodiments of a monostatic radar 300 could be used without departing from the scope of this disclosure.

In the example of FIG. 3, a high-level architecture is shown for a common monostatic radar, i.e., the transmitter and receiver are co-located, either by using a common antenna, or are nearly co-located, while using separate, but adjacent antennas. Monostatic radars are assumed coherent, i.e., transmitter and receiver are synchronized via a common time reference.

In a monostatic radar's most basic form, a radar pulse is generated as a realization of a desired "radar waveform", modulated onto a radio carrier frequency and transmitted through a power amplifier and antenna (shown as a parabolic antenna), either omni-directionally or focused into a particular direction. Assuming a "target" at a distance R from the radar location and within the field-of-view of the transmitted signal, the target will be illuminated by RF power density $p_t$ (in units of W/m$^2$) for the duration of the transmission. The first order, $p_t$ can be described as:

$$p_t = \frac{P_T}{4\pi R^2} G_T = \frac{P_T}{4\pi R^2} \frac{A_T}{(\lambda^2/4\pi)} = P_T \frac{A_T}{\lambda^2 R^2}$$

where:

$P_T$ . . . transmit power [W], $G_T$, $A_T$ . . . transmit antenna gain [dBi], effective aperture area [m$^2$], $\lambda$ . . . wavelength of the radar signal RF carrier signal [m], R . . . target distance [m].

In this example, effects of atmospheric attenuation, multi-path propagation, antenna losses, etc. have been neglected.

The transmit power density impinging onto the target surface will lead to reflections depending on the material composition, surface shape, and dielectric behavior at the frequency of the radar signal. Note that off-direction scattered signals are typically too weak to be received back at the radar receiver, so only direct reflections will contribute to a detectable receive signal. In essence, the illuminated area(s) of the target with normal vectors pointing back at the receiver will act as transmit antenna apertures with directivities (gains) in accordance with their effective aperture area(s). The reflected-back power is:

$$P_{refl} = p_t A_t G_t \sim p_t A_t r_t \frac{A_T}{(\lambda^2/4\pi)} = p_t RCS$$

where:

$P_{refl}$ . . . effective (isotropic) target-reflected power [W], $A_t$, $r_t$, G . . . effective target area normal to the radar direction [m$^2$], reflectivity of the material & shape [0, . . . , 1], and corresponding aperture gain [dBi], RCS Radar Cross Section [m$^2$].

Note that the radar cross section, RCS, is an equivalent area that scales proportionally to the actual reflecting area-squared, inversely proportionally with the wavelength-squared and is reduced by various shape factors and the reflectivity of the material. For a flat, fully reflecting mirror of area $A_t$, large compared with $\lambda^2$, $$RCS = 4\pi A_t^2/\lambda^2.$$

Due to the material and shape dependency, it is generally not possible to deduce the actual physical area of a target from the reflected power, even if the target distance is known.

The target-reflected power at the receiver location results from the reflected-power density at the reverse distance R, collected over the receiver antenna aperture area:

$$P_R = \frac{P_{refl}}{4\pi R^2} A_R = P_T \cdot RCS \frac{A_T A_R}{4\pi\lambda^2 R^4}$$

where:

$P_R$ . . . received, target-reflected power [W], $A_R$ . . . receiver antenna effective aperture area [$m^2$], may be same as $A_T$.

The radar system is usable as long as the receiver signal exhibits sufficient signal-to-noise ratio (SNR), the particular value of which depends on the waveform and detection method used. Generally, in a simpler form:

$$SNR = \frac{P_R}{kT \cdot B \cdot F}$$

where:

$k_T$ . . . Boltzmann's constant x temperature [W/Hz],

B . . . radar signal bandwidth [Hz],

F . . . receiver noise factor (degradation of receive signal SNR due to noise contributions of the receiver circuit itself).

In case the radar signal is a short pulse of duration (width) $T_P$, the delay t between the transmission and reception of the corresponding echo will be equal to $\tau=2R/c$, where c is the speed of (light) propagation in the medium (air). In case there are several targets at slightly different distances, the individual echoes can be distinguished as such only if the delays differ by at least one pulse width, and hence the range resolution of the radar will be $\Delta R=c\Delta\tau/2=cT_P/2$. Further considering that a rectangular pulse of duration $T_P$ exhibits a power spectral density $P(f)\sim(\sin(\pi f T_P)/(\pi f T_P))^2$ with the first null at its bandwidth $B=1/T_P$, the range resolution of a radar is fundamentally connected with the bandwidth of the radar waveform via: $\Delta R=c/2B$.

Although FIG. 3 illustrates an example of a monostatic radar 300, various changes may be made to FIG. 3. For example, various changes to transmitter, the receiver, the processor, etc. could be made according to particular needs.

As discussed above, UWB technology is useful for implementation of a real-time fall detection solution. For example, a monostatic radar similar as described regarding FIG. 3 may utilize UWB technology, which may be integrated into a fall detection system.

Figure 4:
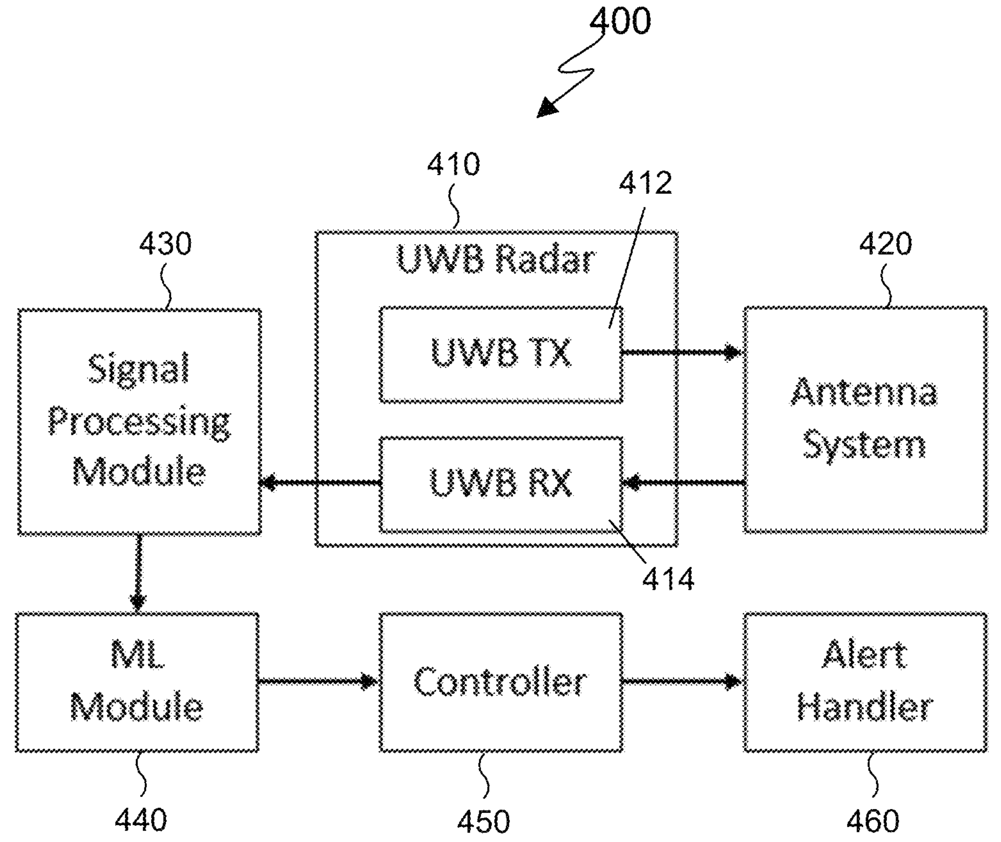
FIG. 4 illustrates an example of components for a general UWB-based fall detection system according to embodiments of the present disclosure.

FIG. 4 illustrates an example of components for a general UWB-based fall detection system 400 according to embodiments of the present disclosure. The embodiment of a UWB-based fall detection system of FIG. 4 is for illustration only. Different embodiments of a UWB-based fall detection system could be used without departing from the scope of this disclosure.

In the example of FIG. 4, UWB-based fall detection system 400 includes a UWB radar system 410, which may operate similarly to the monostatic radar described regarding FIG. 3. For example, in some embodiments UWB radar system 410 emits short high-frequency radio from UWB transmitter (TX) 412, and receives the reflected signals via UWB receiver (RX) 414 via antenna system 420. In some embodiments, antenna system 420 includes a single RX antenna. In some embodiments, antenna system 420 includes at least two RX antennas. System 400 also includes a signal processing module 430, a machine learning (ML) module 440, a controller 450, and an alert handler 460. While elements 430-460 are illustrated as individual components, it should be understood that elements 430-460 may be implemented as a single component. For example, processors 240 of FIG. 2 may be configured to include the functionality of elements 430-460.

In the example of FIG. 4, signal processing module 430 extracts information from the received radar signals. For example, in some embodiments, signal processing module 430 extracts features indicative of human movement, such as velocity, distance and direction. In some embodiments, ML module 440 includes a dedicated algorithm for fall detection. For example, machine learning module 440 may search for distinct patterns associated with falls, such as abrupt changes in velocity, unusual trajectories or inactivity. Machine learning module 440 may also apply some thresholds for movement parameters to increase accuracy and minimize false alarms. In some embodiments, on detecting a fall from machine learning module 440, controller 450 applies post processing to the fall predictions and triggers an alert on a true fall detection. In some embodiments, alert handler 460 processes an alert by sending notifications. For example, alert handler 460 may send a notification via at least one of a web service, SMS message, or phone call to reach out to healthcare providers and emergency services, family members, caretakers, etc. However, alert handler 460 is not limited to processing alerts by sending notifications. For example, alert handler 460 may trigger an audible alarm or visual notification, or perform any other method of disseminating an alert.

Although FIG. 4 illustrates an example of components for a general UWB-based fall detection system 400, various changes may be made to FIG. 4. For example, various changes to the processing pipeline could be made, various components could be omitted, etc. according to particular needs.

Figure 5:
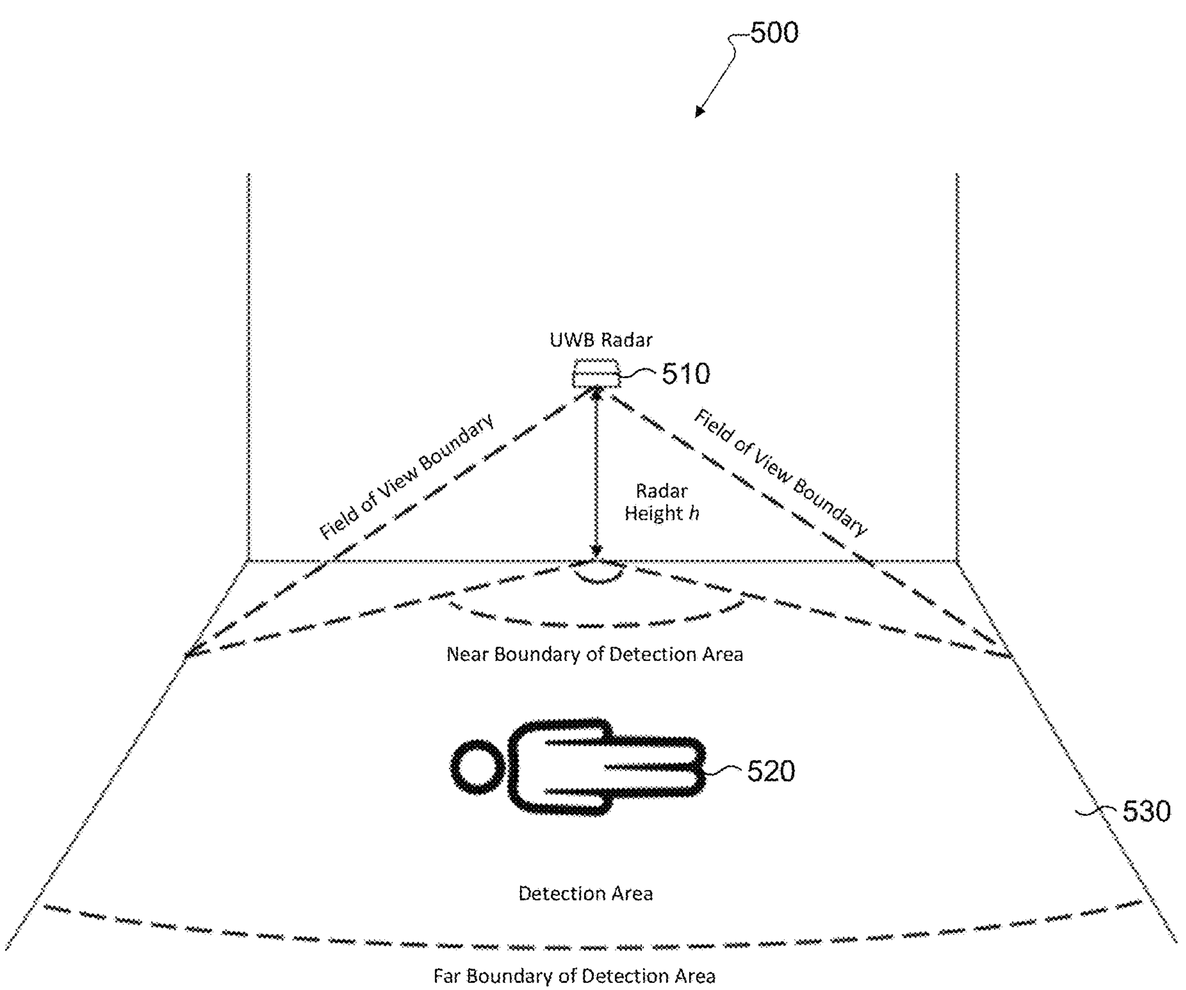
FIG. 5 illustrates an example of a UWB radar work environment according to embodiments of the present disclosure.

FIG. 5 illustrates an example 500 of a UWB radar work environment according to embodiments of the present disclosure. The embodiment of a UWB work environment of FIG. 5 is for illustration only. Different embodiments of a UWB work environment could be used without departing from the scope of this disclosure.

In the example of FIG. 5, an IoT device 510 equipped with a UWB radar (e.g., the UWB radar 410 of FIG. 4) is strategically positioned in an environment where individuals (e.g., human 520) are being monitored in a detection area 530. In some embodiments, IoT device 510 can be placed with a moderate height on a wall, or in fixtures to provide acceptable coverage. To reduce false alarms, the detection area 530 should be within the field of view of the UWB radar, and between a near boundary and a far boundary to the UWB radar. The detection area 530 typically should have good line of sight to the UWB radar.

Although FIG. 5 illustrates an example 500 of a UWB radar work environment, various changes may be made to FIG. 5. For example, various changes to detection area could be made, IoT device 510 could be placed in a different position, etc. according to particular needs.

Figure 6:
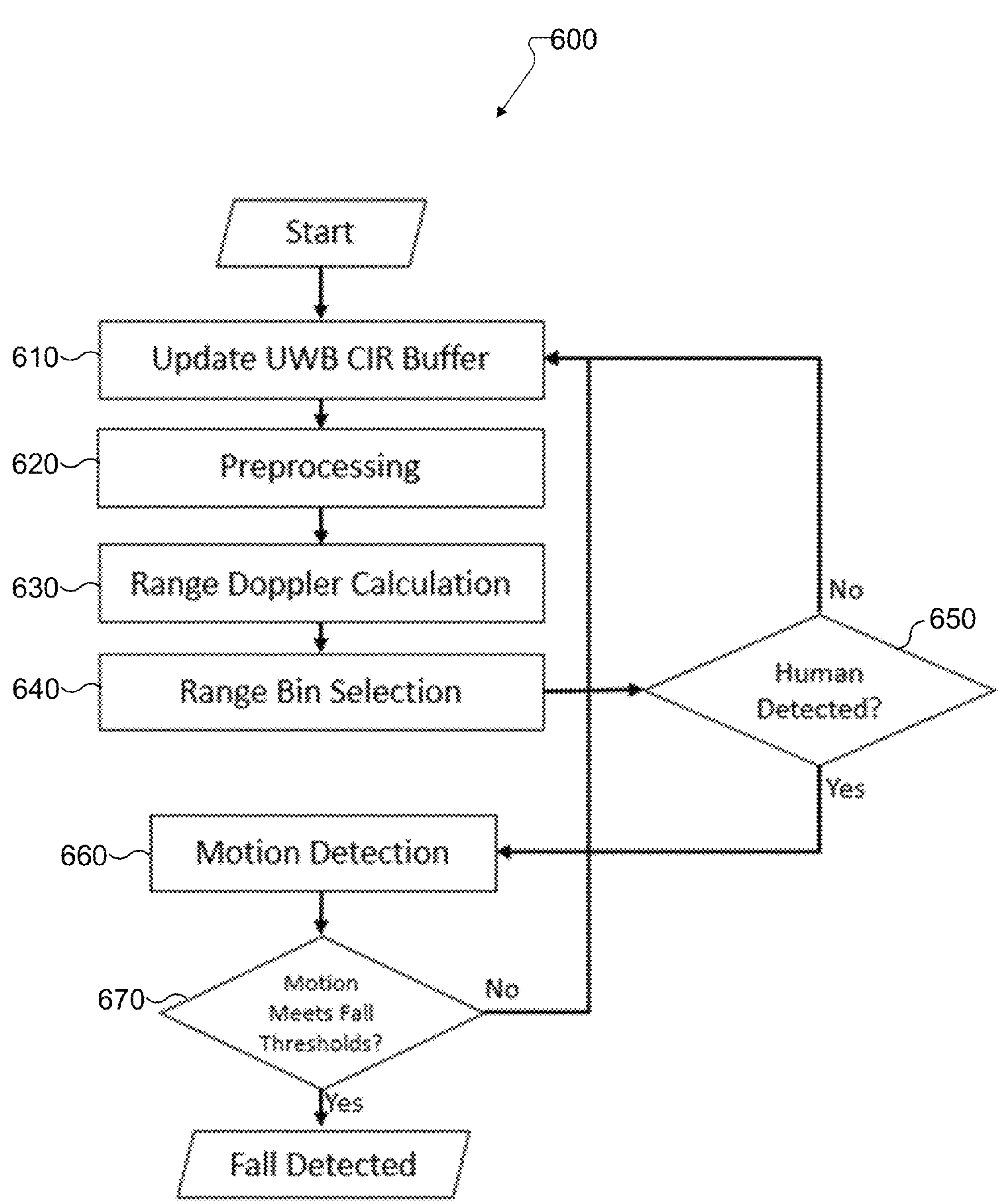
FIG. 6 illustrates an example fall detection procedure according to embodiments of the present disclosure.

FIG. 6 illustrates an example fall detection procedure 600 according to embodiments of the present disclosure. An embodiment of the procedure illustrated in FIG. 6 is for illustration only. One or more of the components illustrated in FIG. 6 may be implemented in specialized circuitry configured to perform the noted functions or one or more of the components may be implemented by one or more processors executing instructions to perform the noted functions. Other embodiments of a fall detection procedure could be used without departing from the scope of this disclosure.

In the example of FIG. 6, procedure 600 begins at step 610. At step 610, an electronic device, such as IoT device

510 of FIG. 5, that includes at least two RX antennas for an UWB radar begins monitoring the reception of the UWB radar for a fall. When the electronic device begins monitoring the reception of the UWB radar, a temporal buffer for each RX antenna is continuously updated with new channel impulse response (CIR) frames. In some embodiments, the buffer stores CIR frames for a particular period of time, e.g., at least 20 seconds. For example, with a radar frame rate of 200 Hz and two RX antennas, the CIR buffer may store a sequence of 8000 frames. Each CIR frame may include and/or use a range bin, which is the distance (or holds or represents values of distance) from the radar, and a Doppler bin, which is the velocity (or holds or represents values of velocity) of each point in particular range bins.

At step 620, the electronic device performs preprocessing on the data in the CIR buffer. To perform the preprocessing, the electronic device may include a signal processing module, such as signal processing module 430 of FIG. 4. The preprocessing may be used to eliminate the effects of stationary and slowly moving objects in the detection area. For example, in some embodiments the electronic device may employ various data processing methods such as background/clutter removal, and low pass filtering for artifact removal. In some embodiments, a clutter removal filter is implemented using an infinite impulse response (IIR) filter, which uses current and previous inputs and outputs to filter data which does not change in time.

At step 630, the electronic device performs range Doppler calculations on the preprocessed data from step 620 to measure the range and energy level of objects detected within the detection area. For example, in some embodiments the electronic device may perform a range Doppler mapping procedure on the preprocessed data. To perform the range Doppler mapping procedure, the electronic device may compute a range fast Fourier transform (FFT) and a Doppler FFT to the preprocessed data to generate a range Doppler map. When a chirp is transmitted and reflects from an object, the receiver gets a delayed version of the chirp. The time difference between the transmitted and received chirp is directly proportional to the range of the object. The difference in the transmitted chirp frequency (f1) and received chirp frequency (f2) may be calculated by passing both the chirps through a mixer establishing an intermediate frequency (IF) which produces a signal with frequency, f1+f2, and another with frequency f1-f2. When both chirps are passed through a low-pass filter such that only the chirp with frequency f1-f2 remains, an FFT can be performed on that temporal signal to reveal the frequency value. The location of the peaks in the frequency spectrum directly correspond to the range of the objects. To perform the range Doppler calculations, the electronic device may include a signal processing module, such as signal processing module 430 of FIG. 4.

As step 640, the electronic device selects range bins to detect whether a human is in the detection area at step 650. Because objects detected in the range Doppler calculations performed at step 630 can be any mobile objects including a human, some embodiments may utilize a range bin selection algorithm to filter non-human objects. To select the range bins and detect whether a human is in the detection area, the electronic device may include a machine learning module, such as ML module 440 of FIG. 4. For example, a human-like object can be detected based on a machine learning algorithm that evaluates the energy level and shape or size of the reflection cluster on a range Doppler map and spectrograms. The range of the detected human-like object can also be estimated from the range bin of the cluster centroid. For example, by performing a Cell Averaging Constant False Alarm Rate CA-CFAR detection method on the range Doppler map, non-human moving objects such as fans can be removed with an adaptive threshold(s) of energy levels. Then the remaining set of bins can be clustered with algorithms such as density-based spatial clustering of applications with noise (DBSCAN) for human target detection. Other algorithms for detecting vital signs such as breath or heartbeat can also be applied to reduce false detections of humans.

At step 650, if a human is detected in the detection area, the procedure proceeds to step 660. Otherwise, if no human is detected in the detection area, the procedure returns to step 610.

At step 660, the electronic devices performs motion detection. In some embodiments, to perform the motion detection, the electronic device may utilize an algorithm that calculates angle of arrival based on the signal difference from at least two RX antennas in azimuth, then estimates the location of the human based on the angle of arrival and range bin, and tracks the changes of velocity, pose and location of the detected human object over time. Upon a human movement being detected at a certain range bin rb corresponding to the distance r, the CIR windows from RX1 and RX2 at range bin rb are extracted and used to estimate the angle of arrival θ of this movement with respect to the radar. The estimation can be performed by utilizing various methods, including, for example, phase comparison, Bartlett, minimum variance distortion-less response (MVDR), and multiple signal classification (MUSIC) algorithms. Once the distance r and angle-of-arrival θ are known, the 2D coordinate(s) of the human movement with respect to the radar's coordinate system can be calculated: $x=r*\sin\theta$, $y=r*\cos\theta$. With at least two RX antennas in altitude, the elevation angle change of motion over time can also be estimated. In some embodiments, to perform the motion detection, the electronic device may include a machine learning module, such as ML module 440 of FIG. 4.

At step 670, the electronic device detects whether a fall has occurred based on the results of the motion detection algorithm. For example, in some embodiments, the electronic device may detect a fall based on an elevation angle change of a human body exceeding a threshold, or an abrupt velocity change. In some embodiments, to detect whether a fall has occurred, the electronic device may include a machine learning module, such as ML module 440 of FIG. 4. For example, a machine learning model can also predict a fall based on the velocity and pose of the human body. For example, if the machine learning model determines that the detected human is prone or supine after a rapid velocity change, this may be indicative of a fall, and the machine learning model may determine that a fall has been detected.

Although FIG. 6 illustrates one example fall detection procedure 600, various changes may be made to FIG. 6. For example, while shown as a series of steps, various steps in FIG. 6 could overlap, occur in parallel, occur in a different order, occur any number of times, be omitted, or replaced by other steps.

Figure 7:
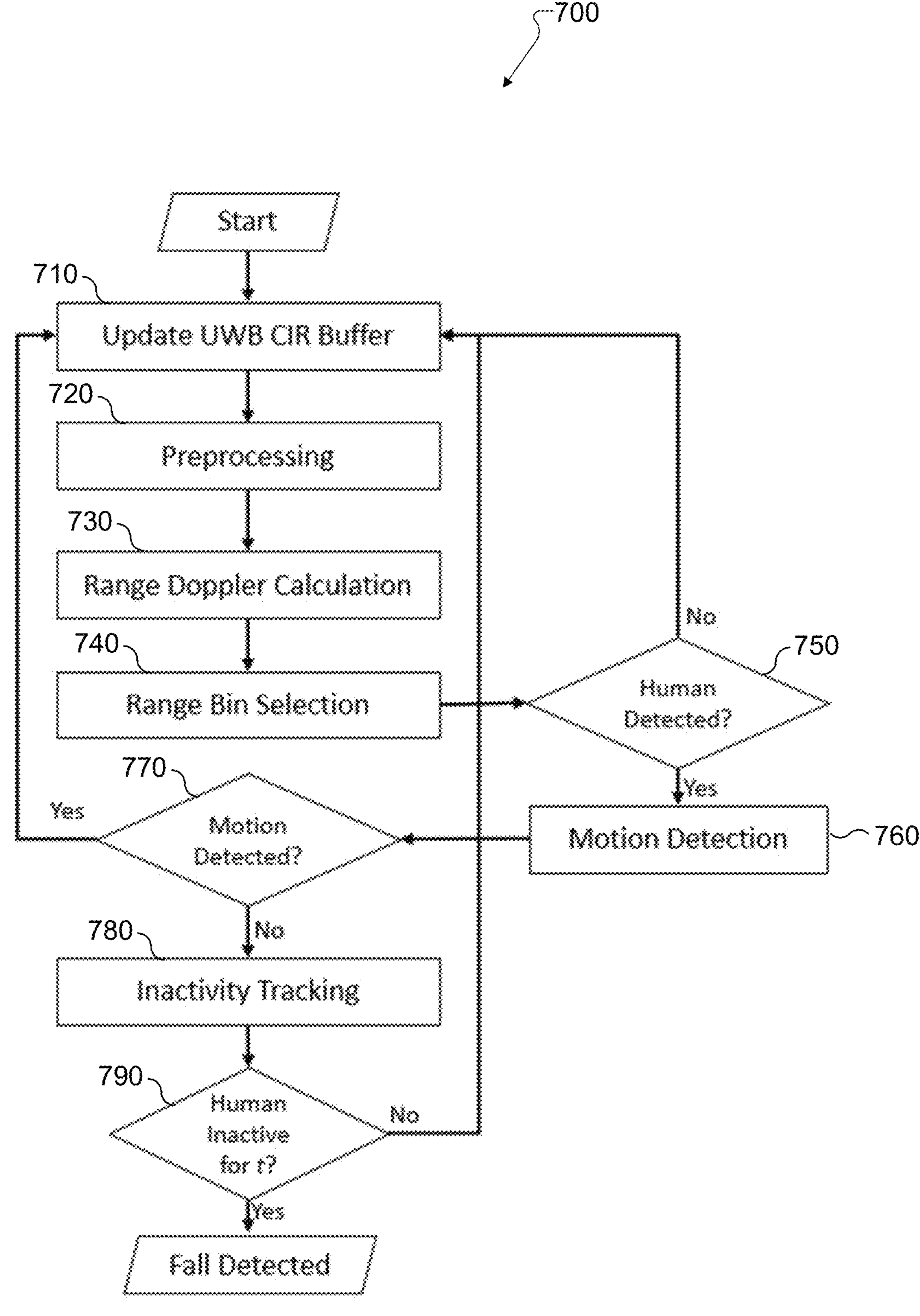
FIG. 7 illustrates another example fall detection procedure according to embodiments of the present disclosure.

In some circumstances, an electronic device may have limited UWB hardware. For example, the antenna system 420 of FIG. 4 may only include a single RX antenna. This may limit the electronic device's ability to accurately estimate an elevation angle similar as described regarding FIG. 6. FIG. 7 provides an alternative procedure where fall detection is based on inactivity rather than estimation of an elevation angle.

FIG. 7 illustrates another example fall detection procedure 700 according to embodiments of the present disclosure. An embodiment of the procedure illustrated in FIG. 7 is for illustration only. One or more of the components illustrated in FIG. 7 may be implemented in specialized circuitry configured to perform the noted functions or one or more of the components may be implemented by one or more processors executing instructions to perform the noted functions. Other embodiments of a fall detection procedure could be used without departing from the scope of this disclosure.

In the example of FIG. 7, procedure 700 begins at step 710. At step 710, an electronic device, such as IoT device 510 of FIG. 5, that includes only a single RX antenna for a UWB radar begins monitoring the reception of the UWB radar for a fall. However, it should be understood that procedure 700 may be performed by an electronic device that includes multiple RX antennas for a UWB radar. When the electronic device begins monitoring the reception of the UWB radar, a temporal buffer for the RX antenna is continuously updated with new channel impulse response (CIR) frames. In some embodiments, the buffer stores CIR frames for a particular period of time, e.g., at least 20 seconds. For example, with a radar frame rate of 200 Hz and one RX antenna, the CIR buffer may store a sequence of 4000 frames. Each CIR frame may include and/or use a range bin, which is the distance (or holds values of distance) from the radar, and a Doppler bin, which is the velocity (or holds values of velocity) of each point in particular range bins.

At step 720, the electronic device performs preprocessing on the data in the CIR buffer. To perform the preprocessing, the electronic device may include a signal processing module, such as signal processing module 430 of FIG. 4. The preprocessing may be used to eliminate the effects of stationary and slowly moving objects in the detection area. For example, in some embodiments the electronic device may employ various data processing methods such as background/clutter removal, and low pass filtering for artifact removal. In some embodiments, a clutter removal filter is implemented using an infinite impulse response (IIR) filter, which uses current and previous inputs and outputs to filter data which does not change in time.

At step 730, the electronic device performs range Doppler calculations on the preprocessed data from step 720 to measure the range and energy level of objects detected within the detection area. For example, in some embodiments the electronic device may perform a range Doppler mapping procedure on the preprocessed data. To perform the range Doppler mapping procedure, the electronic device may compute a range fast Fourier transform (FFT) and a Doppler FFT to the preprocessed data to generate a range Doppler map. When a chirp is transmitted and reflects from an object, the receiver gets a delayed version of the chirp. The time difference between the transmitted and received chirp is directly proportional to the range of the object. The difference in the transmitted chirp frequency (f1) and received chirp frequency (f2) may be calculated by passing both the chirps through a mixer establishing an intermediate frequency (IF) which produces a signal with frequency, f1+f2, and another with frequency f1-f2. When both chirps are passed through a low-pass filter such that only the chirp with frequency f1-f2 remains, an FFT can be performed on that temporal signal to reveal the frequency value. The location of the peaks in the frequency spectrum directly correspond to the range of the objects. To perform the range Doppler calculations, the electronic device may include a signal processing module, such as signal processing module 430 of FIG. 4.

As step 740, the electronic device selects range bins to detect whether a human is in the detection area at step 750. Because objects detected in the range Doppler calculations performed at step 730 can be any mobile objects including a human, some embodiments may utilize a range bin selection algorithm to filter non-human objects. To select the range bins and detect whether a human is in the detection area, the electronic device may include a machine learning module, such as ML module 440 of FIG. 4. For example, a human-like object can be detected based on a machine learning algorithm that evaluates the energy level and shape or size of the reflection cluster on a range Doppler map and spectrograms. The range of the detected human-like object can also be estimated from the range bin of the cluster centroid. For example, by performing CA-CFAR detection on the range Doppler map, non-human moving objects such as fans can be removed with an adaptive threshold(s) of energy levels. Then the remaining set of bins can be clustered with algorithms such as DBSCAN for human target detection. Other algorithms for detecting vital signs such as breath or heartbeat can also be applied to reduce false detections of a human.

At step 750, if a human is detected in the detection area, the procedure proceeds to step 760. Otherwise, if no human is detected in the detection area, the procedure returns to step 710.

At step 760, the electronic device performs motion detection. In some embodiments, to perform the motion detection, the electronic device may utilize a motion detection algorithm. In some embodiments, the motion detection algorithm may track the changes of velocity, pose and location of the detected human object over time based on the received radar signals to identify that a human-like object has moved within the detection area. However, the electronic device is not limited to any particular motion algorithm to perform the motion detection at step 760. In some embodiments, to perform the motion detection, the electronic device may include a machine learning module, such as ML module 440 of FIG. 4.

At step 770, if no motion is detected by the motion detection algorithm, the procedure proceeds to step 780. Otherwise, the procedure returns to step 710.

At step 780, the electronic device performs an inactivity procedure. In some embodiments, the inactivity procedure may include monitoring an inactivity timer. For example, in some embodiments, the electronic device may start an inactivity timer after failing to detect motion of the human in step 770. If no motion is detected for a time/after the inactivity timer has started, this may be indicative that a fall has occurred.

At step 790, the electronic devices determines whether a fall has occurred based on the inactivity procedure. For example, if the inactivity procedure includes monitoring of an inactivity timer and the timer has reached a time/without activity being detected, the electric device determines that a fall has been detected. Otherwise, if activity is detected, the process returns to step 710.

Although FIG. 7 illustrates one example method for fall detection procedure 700, various changes may be made to FIG. 7. For example, while shown as a series of steps, various steps in FIG. 7 could overlap, occur in parallel, occur in a different order, occur any number of times, be omitted, or replaced by other steps.

Figure 8:
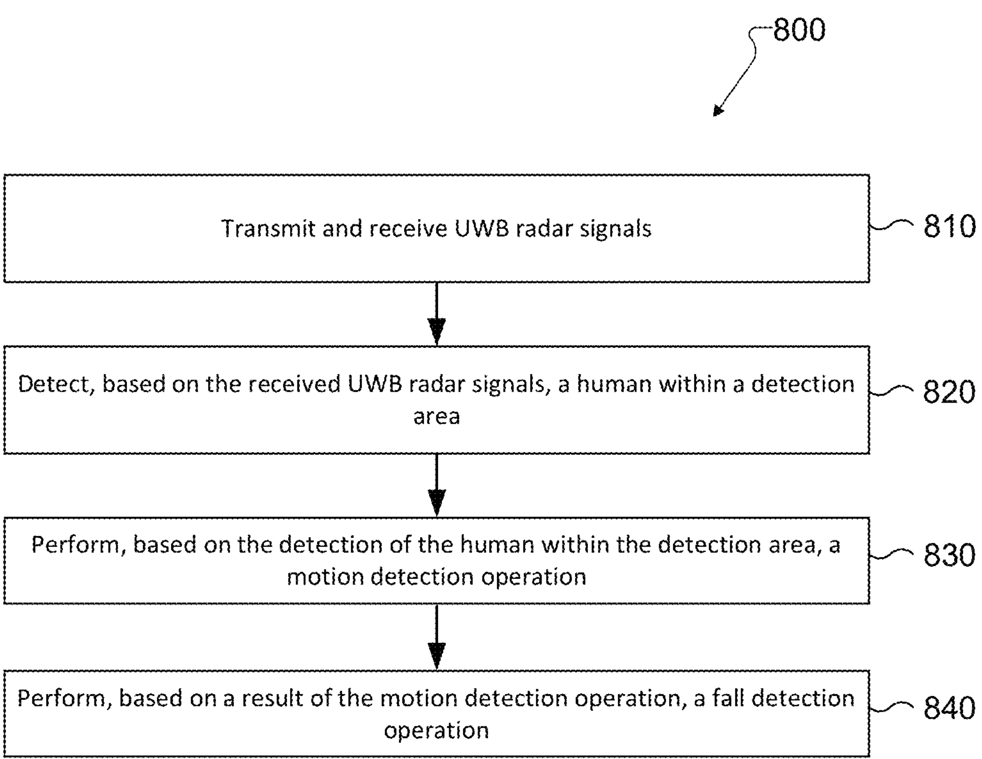
FIG. 8 illustrates an example method for UWB-based fall detection according to embodiments of the present disclosure.

FIG. 8 illustrates an example method for UWB-based fall detection 800 according to embodiments of the present disclosure. An embodiment of the method illustrated in FIG. 8 is for illustration only. One or more of the components illustrated in FIG. 8 may be implemented in specialized circuitry configured to perform the noted functions or one or more of the components may be implemented by one or more processors executing instructions to perform the noted functions. Other embodiments of a method for UWB-based fall detection could be used without departing from the scope of this disclosure.

In the example of FIG. 8, method 800 begins at step 810. At step 810, an electronic device, such as IoT device 510 of FIG. 5, transmits and receives UWB radar signals. In some embodiments, the transmission and reception of the UWB radar signals may be similar as described regarding the monostatic radar of FIG. 3. In some embodiments, the electronic device may include at least to RX antennas configured to receive the UWB signals.

At step 820, the electronic device detects, based on the received UWB radar signals, a human within a detection area of the electronic device.

In some embodiments, to detect the human within the detection area of the electronic device, the electronic device may generate a plurality of UWB channel impulse response (CIR) frames based on the transmitted and received UWB radar signals. The electronic device may store the plurality of UWB CIR frames within a buffer. Additionally, the electronic device may preprocess the plurality of UWB CIR frames stored within the buffer, and perform range doppler calculations on the preprocessed plurality of UWB CIR frames. Furthermore, the electronic device may perform, based on a result of the range doppler calculations, a range bin selection operation, and detect the human within the detection area of the transceiver based on a result of the range bin selection operation, and based on removing one or more non-human artifacts.

In some embodiments, the detection the human within the detection area of the electronic device may be performed similar as described regarding steps 610-650 of FIG. 6, or steps 710-750 of FIG. 7. In some embodiments, the detection area may be similar as described regarding detection area 530 of FIG. 5.

At step 830, the electronic device performs, based on the detection of the human within the detection area of the electronic device, a motion detection operation.

In some embodiments, to perform the motion detection operation, the electronic device may determine an azimuth difference in the UWB radar signals received by at least two RX antennas, and determine an angle of arrival based on the determined azimuth difference. The electronic device may also estimate a location of the human based on the angle of arrival and a range bin.

In some embodiments, the electronic device may perform the motion detection operation similar as described regarding step 660 of FIG. 6, or step 760 of FIG. 7.

At step 840, the electronic device performs, based on a result of the motion detection operation, a fall detection operation.

In some embodiments, the electronic device may perform the fall detection operation based on the result of the motion detection operation being a detection of motion. In some embodiments, to perform the fall detection operation, the electronic device may determine whether the motion meets a fall threshold, and when the motion meets the fall threshold, determine that a fall occurred. In some embodiments, to determine whether the motion meets the fall threshold, the electronic device may determine whether at least one of a change in an elevation angle of the human has exceeded an elevation change threshold, or velocity of the human has exceeded a velocity threshold.

In some embodiments, the electronic devices may perform the fall detection operation based on the result of the motion detection operation being no detection of a motion. In some embodiments, to perform the fall detection operation the electronic device may perform an inactivity tracking operation. To perform the inactivity tracking operation, the electronic device may determine whether the human has been inactive for a time threshold, and when the human has been inactive for at least the time threshold, determining that a fall has occurred.

In some embodiments, the electronic device may perform the fall detection operation similar as described regarding step 670 of FIG. 6 or steps 780-790 of FIG. 7.

Although FIG. 8 illustrates one example method for UWB-based fall detection 800, various changes may be made to FIG. 8. For example, while shown as a series of steps, various steps in FIG. 8 could overlap, occur in parallel, occur in a different order, occur any number of times, be omitted, or replaced by other steps.

Any of the above variation embodiments can be utilized independently or in combination with at least one other variation embodiment. The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claim scope. The scope of patented subject matter is defined by the claims.

What is claimed is:

1. An electronic device comprising:

a transceiver configured to transmit and receive ultrawide band (UWB) radar signals; and a processor operatively coupled to the transceiver, the processor configured to:

generate a plurality of UWB channel impulse response (CIR) frames based on the transmitted and received UWB radar signals;

store the plurality of UWB CIR frames within a buffer;

preprocess the plurality of UWB CIR frames stored within the buffer;

perform range doppler calculations on the preprocessed plurality of UWB CIR frames;

perform, based on a result of the range doppler calculations, a range bin selection operation;

detect a human within a detection area of the transceiver based on a result of the range bin selection operation and based on removing one or more non-human artifacts;

perform, based on the detection of the human within the detection area of the transceiver, a motion detection operation; and perform, based on a result of the motion detection operation, a fall detection operation.

2. The electronic device of claim 1, wherein the processor is further configured to:

determine, based on a result of the fall detection operation, that a fall has a occurred; and process an alert in response to the determination that a fall has occurred.

3. The electronic device of claim 1, wherein:

the transceiver comprises at least two receive (RX) antennas configured to receive the UWB radar signals; and to perform the motion detection operation, the processor is further configured to:

determine an azimuth difference in the UWB radar signals received by the at least two RX antennas;

determine an angle of arrival based on the determined azimuth difference; and estimate a location of the human based on the angle of arrival and a range bin.

4. The electronic device of claim 1, wherein:

the fall detection operation is performed based on the result of the motion detection operation being a detection of a motion; and to perform the fall detection operation, the processor is further configured to:

determine whether the motion meets a fall threshold; and when the motion meets the fall threshold, determine that a fall has occurred.

5. The electronic device of claim 4, wherein to determine whether the motion meets the fall threshold, the processor is further configured to determine whether at least one of:

a change in an elevation angle of the human has exceeded an elevation change threshold; or a velocity of the human has exceeded a velocity threshold.

6. The electronic device of claim 1, wherein:

the fall detection operation is performed based on the result of the motion detection operation being no detection of a motion; and to perform the fall detection operation, the processor is further configured to perform an inactivity tracking operation.

7. The electronic device of claim 6, wherein to perform the inactivity tracking operation, the processor is further configured to:

determine whether the human has been inactive for a time threshold; and when the human has been inactive for at least the time threshold, determine that a fall has occurred.

8. A method of operating an electronic device, the method comprising:

transmitting and receiving ultrawide band (UWB) radar signals;

generating a plurality of UWB channel impulse response (CIR) frames based on the transmitted and received UWB radar signals;

storing the plurality of UWB CIR frames within a buffer;

preprocessing the plurality of UWB CIR frames stored within the buffer;

performing range doppler calculations on the preprocessed plurality of UWB CIR frames;

performing, based on a result of the range doppler calculations, a range bin selection operation;

detecting a human within a detection area of the electronic device based on a result of the range bin selection operation and based on removing one or more non-human artifacts;

performing, based on the detection of the human within the detection area of the electronic device, a motion detection operation; and performing, based on a result of the motion detection operation, a fall detection operation.

9. The method of claim 8, further comprising:

determining, based on a result of the fall detection operation, that a fall has a occurred; and processing an alert in response to the determination that a fall has occurred.

10. The method of claim 8, wherein:

the electronic device comprises at least two receive (RX) antennas configured to receive the UWB radar signals; and to perform the motion detection operation, the method further comprises:

determining an azimuth difference in the UWB radar signals received by the at least two RX antennas;

determining an angle of arrival based on the determined azimuth difference; and estimating a location of the human based on the angle of arrival and a range bin.

11. The method of claim 8, wherein:

the fall detection operation is performed based on the result of the motion detection operation being a detection of a motion; and to perform the fall detection operation, the method further comprises:

determining whether the motion meets a fall threshold; and when the motion meets the fall threshold, determining that a fall has occurred.

12. The method of claim 11, wherein to determine whether the motion meets the fall threshold, the method further comprises determining whether at least one of:

a change in an elevation angle of the human has exceeded an elevation change threshold; or a velocity of the human has exceeded a velocity threshold.

13. The method of claim 8, wherein:

the fall detection operation is performed based on the result of the motion detection operation being no detection of a motion; and to perform the fall detection operation, the method further comprises performing an inactivity tracking operation.

14. The method of claim 13, wherein to perform the inactivity tracking operation, the method further comprises:

determining whether the human has been inactive for a time threshold; and when the human has been inactive for at least the time threshold, determining that a fall has occurred.

15. A non-transitory computer readable medium embodying a computer program, the computer program comprising program code that, when executed by a processor of a device, causes the device to:

transmit and receive ultrawide band (UWB) radar signals;

generate a plurality of UWB channel impulse response (CIR) frames based on the transmitted and received UWB radar signals;

store the plurality of UWB CIR frames within a buffer;

preprocess the plurality of UWB CIR frames stored within the buffer;

perform range doppler calculations on the preprocessed plurality of UWB CIR frames;

perform, based on a result of the range doppler calculations, a range bin selection operation;

detect a human within a detection area of the device based on a result of the range bin selection operation and based on removing one or more non-human artifacts;

perform, based on the detection of the human within the detection area of the device, a motion detection operation; and perform, based on a result of the motion detection operation, a fall detection operation.

16. The non-transitory computer readable medium of claim 15, wherein the program code, when executed by the processor of the device, further causes the device to:

determine, based on a result of the fall detection operation, that a fall has a occurred; and process an alert in response to the determination that a fall has occurred.

17. The non-transitory computer readable medium of claim 15, wherein:

the device comprises at least two receive (RX) antennas configured to receive the UWB radar signals; and to perform the motion detection operation, the program code, when executed by the processor of the device, further causes the device to:

determine an azimuth difference in the UWB radar signals received by the at least two RX antennas;

determine an angle of arrival based on the determined azimuth difference; and estimate a location of the human based on the angle of arrival and a range bin.

18. The non-transitory computer readable medium of claim 15, wherein:

the fall detection operation is performed based on the result of the motion detection operation being a detection of a motion; and to perform the fall detection operation, the program code, when executed by the processor of the device, further causes the device to:

determine whether the motion meets a fall threshold; and when the motion meets the fall threshold, determine that a fall has occurred.

19. The non-transitory computer readable medium of claim 18, wherein to determine whether the motion meets the fall threshold, the program code, when executed by the processor of the device, further causes the device to determine whether at least one of:

a change in an elevation angle of the human has exceeded an elevation change threshold; or a velocity of the human has exceeded a velocity threshold.

20. The non-transitory computer readable medium of claim 15, wherein:

the fall detection operation is performed based on the result of the motion detection operation being no detection of a motion; and to perform the fall detection operation, the program code, when executed by the processor of the device, further causes the device to perform an inactivity tracking operation comprising:

determining whether the human has been inactive for a time threshold; and when the human has been inactive for at least the time threshold, determining that a fall has occurred.

* * * * *